(12) United States Patent
Surjan

(10) Patent No.: US 9,040,607 B2
(45) Date of Patent: May 26, 2015

(54) ADHESIVE COMPOSITION

(75) Inventor: James E. Surjan, Sherman, CT (US)

(73) Assignee: BLACK & DECKER INC., Newark, DE (US)

( * ) Notice: Subject to any disclaimer, the term of this patent is extended or adjusted under 35 U.S.C. 154(b) by 354 days.

(21) Appl. No.: 13/419,084

(22) Filed: Mar. 13, 2012

(65) Prior Publication Data

US 2012/0259041 A1    Oct. 11, 2012

Related U.S. Application Data

(60) Provisional application No. 61/473,554, filed on Apr. 8, 2011.

(51) Int. Cl.
| | |
|---|---|
| *C08G 59/22* | (2006.01) |
| *C08L 61/00* | (2006.01) |
| *C08L 61/06* | (2006.01) |
| *C08L 63/00* | (2006.01) |
| *C08G 59/08* | (2006.01) |
| *C08G 59/62* | (2006.01) |
| *C08G 59/68* | (2006.01) |
| *C09J 163/04* | (2006.01) |

(52) U.S. Cl.
CPC ............... *C08G 59/08* (2013.01); *C08G 59/62* (2013.01); *C08G 59/686* (2013.01); *C09J 163/04* (2013.01)

(58) Field of Classification Search
CPC ...................................................... C08G 59/08
USPC .......................................................... 528/87
See application file for complete search history.

(56) References Cited

U.S. PATENT DOCUMENTS

| | | | |
|---|---|---|---|
| 5,730,557 | A | 3/1998 | Skupien et al. |
| 5,731,366 | A | 3/1998 | Moench et al. |
| 2001/0035111 | A1 | 11/2001 | Gienau et al. |
| 2004/0266972 | A1 | 12/2004 | Surjan |
| 2007/0119745 | A1 | 5/2007 | Vogel et al. |
| 2007/0264506 | A1 | 11/2007 | Wigger |

FOREIGN PATENT DOCUMENTS

EP    1810985 A1    7/2007

OTHER PUBLICATIONS

International Search Report and Written Opinion; Date of Mailing Jun. 5, 2012; International Application No. PCT/EP2012/054556; European International Searching Authority; International Search Report 5 pages; Written Opinion 5 pages.

*Primary Examiner* — Peter F Godenschwager
*Assistant Examiner* — David Karst
(74) *Attorney, Agent, or Firm* — Cantor Colburn LLP

(57) ABSTRACT

An adhesive composition includes a first part comprising about 15 to about 60 wt % of an epoxy compound, about 35 to about 80 wt % of an epoxy novolac, and about 5 to about 25 wt % of an epoxy-based reactive diluent based on the total weight of epoxy compound, epoxy novolac, and reactive diluent; and a second part comprising less than about 20 wt % of a hydroxyaromatic solvent, about 80 to about 99 wt % of a Mannich base, and about 1 to about 20 wt % of a tertiary amine, based on the total weight of hydroxyaromatic solvent, Mannich base, and tertiary amine, the first and second parts being present in a volume ratio of about 0.8:1 to about 1.2:1. Additives to further enhance the properties may be included. A method of forming an adhesive layer includes applying the adhesive composition to a surface.

11 Claims, No Drawings

ADHESIVE COMPOSITION

CROSS-REFERENCE TO RELATED APPLICATION

This application is a nonprovisional of provisional U.S. application Ser. No. 61/473,554, filed Apr. 8, 2011, the content of which is incorporated herein by reference in its entirety.

FIELD OF THE INVENTION

This invention relates to an adhesive composition for industrial or commercial construction applications. Specifically, the adhesive secures pins, bolts, rods, and other anchoring devices, in place in structural openings formed in concrete, masonry, metals (e.g., steel), ceramics, and glass.

BACKGROUND OF THE INVENTION

Chemical adhesives, such as those based on epoxy or free-radically initiated compositions, may include two or more components that react together and cure when mixed. Such adhesive compositions are widely used for a variety of applications, and are dispensed in a variety of different, convenient motifs. For example, U.S. Pat. No. 5,730,557 discloses a mortar mixture capsule unit for chemical attachment of anchors in boreholes. The capsule houses a filler material, and a chemical binder system contained in smaller capsules within the filler material. The cartridge is inserted into a borehole, and a driving tool is used to insert an anchor. Pressure exerted on the cartridge by the inserting anchor ruptures both the housing capsule and the smaller capsules contained within it, causing the chemical binder system to mix with the filler, thereby curing the binder system/filler mixture and securing the anchor within the borehole. A similar adhesive is sold by Hilti AG under the trade name "HVU".

U.S. Pat. No. 5,731,366 discloses a chemical plugging compound based on a free-radically polymerizable resin and a free-radical initiator provided in a separate (non-mixing) state, such as encapsulated in glass, gelatin or cellulose capsules.

Such adhesives have certain disadvantages, primarily the lack of control of metering. Because one or both components are fluid, and must be encapsulated in a package prior to use, it is at the least inconvenient to vary the size of a capsule or the amount of adhesive in the capsule, and hence, for applications such as securing anchors, the boreholes can end up receiving the same amount of pre-packaged adhesive irrespective of borehole size. As a result of inadequate metering, excess adhesive may flow or spill prior to full cure, particularly where the borehole is upside down and vertical as in a ceiling or roof, and cartridges can fall from overhead boreholes. Furthermore, such encapsulation techniques do not assure that the smaller capsules used to contain the binder and/or initiator will remain evenly dispersed, which can lead to uneven or inadequate reinforcement of the anchor.

Alternatively, adhesives in which the binder and curing agent are dispensed from separate cartridges may be used, where the separate cartridges are simultaneously injected into a borehole using a two-barrel epoxy gun which brings the two parts together at the point of injection, whereupon they react upon entering the borehole. Such epoxy guns are commonly designed to inject the contents of each tube at the same rate, with the same volume of binder and curing agent being dispensed simultaneously. However, for such a system to function properly and avoid the problem of variations in metering, the adhesive composition must provide optimum performance when combined in a 1:1 ratio by volume, which is a typical design configuration of epoxy guns.

BRIEF SUMMARY OF THE INVENTION

The above and other deficiencies of the prior art are overcome by, in an embodiment, an adhesive composition comprising a first part comprising about 15 to about 60 wt % of an epoxy compound, about 35 to about 80 wt % of an epoxy novolac, and about 5 to about 25 wt % of an epoxy-based reactive diluent based on the total weight of epoxy compound, epoxy novolac, and reactive diluent; and a second part comprising less than about 20 wt % of a hydroxyaromatic solvent, about 80 to about 99 wt % of a Mannich base, and about 1 to about 20 wt % of a tertiary amine, based on the total weight of hydroxyaromatic solvent, Mannich base, and tertiary amine, the first and second parts being present in a volume ratio of about 0.8:1 to about 1.2:1.

In another embodiment, an adhesive composition comprises a first part comprising about 10 to about 50 wt % of an epoxy compound, about 20 to about 70 wt % of an epoxy novolac, about 5 to about 20 wt % of an epoxy-based reactive diluent, and about 10 to about 40 wt % of first part additives, based on the total weight of the first part; and a second part comprising less than about 10 wt % of a hydroxyaromatic solvent, about 10 to about 30 wt % of a Mannich base, and about 0.1 to about 10 wt % of a tertiary amine, and about 60 to about 90 wt % of second part additives, based on the total weight of the second part, the first and second parts being present in a volume ratio of about 0.8:1 to about 1.2:1.

In another embodiment, a method of forming an adhesive layer comprises combining a first part and a second part of an adhesive composition, the first part comprising about 15 to about 60 wt % of an epoxy compound, about 35 to about 80 wt % of an epoxy novolac, and about 5 to about 25 wt % of an epoxy-based reactive diluent based on the total weight of epoxy compound, epoxy novolac, and reactive diluent; and the second part comprising less than about 20 wt % of a hydroxyaromatic solvent, about 80 to about 99 wt % of a Mannich base, and about 1 to about 20 wt % of a tertiary amine, based on the total weight of hydroxyaromatic solvent, Mannich base, and tertiary amine, the first and second parts being present in a volume ratio of about 0.8:1 to about 1.2:1; and applying the adhesive composition to a surface.

In another embodiment, a method of forming an adhesive composition comprises forming a first combination by combining until homogeneous about 23.50 wt % of bisphenol A diepoxy, about 43.01 wt % of epoxy novolac, about 9.81 wt % of 2-ethyl-2-hydroxymethyl-1,3-propanediol copolymer with chloromethyloxirane, about 2.51 wt % of fumed silica suspension agent, about 0.10 wt % of titanium dioxide, about 5.27 wt % of silica sand having a mesh size greater than 50, and about 15.80 wt % of silica sand having a mesh size of less than 25; forming a second composition by combining until homogeneous: about 24.40 wt % of 1,3-(N,N-dimethylaminomethyl)benzene, about 2.80 wt % of tertiary amine hardener, about 2.80 wt % of benzyl alcohol, about 0.90 wt % of fumed silica suspension agent, about 0.02 wt % of carbon black, about 17.50 wt % of fine silica sand of greater than 50 mesh, and about 52.48 wt % of coarse silica sand of less than 25 mesh; and combining the first and second compositions in a ratio of about 1:1 by volume.

DETAILED DESCRIPTION OF THE INVENTION

An adhesive composition disclosed herein includes a first part containing the binder resin composition, and a second part containing the curing agent. The binder resin is composed of an epoxy compound, an epoxy novolac, and a reactive diluent, which in combination provide a curable matrix with a high degree of crosslink density. The curing agent contains a combination of an aromatic solvent, a Mannich base, and an accelerator to accelerate the cure. The first and second parts, each of which may further include additives, are formulated so that the first and second parts combine in a ratio of about 0.8:1 to about 1.2:1 by volume. The composition so formulated, is ideally suited to dispense using commercial epoxy gun or injection systems, and provides a high degree of cure for the composition.

The first part of the adhesive composition includes thermosetting resin components as reactive components. The reactive components include an epoxy compound, an epoxy novolac, and an epoxy-based reactive diluent.

Epoxy compounds useful herein include diglyidyl ethers of bisphenol F, octadecylene oxide, glycidylmethacrylate, diglycidyl ether of bisphenol A, vinylcyclohexene dioxide, 3,4-epoxycyclohexylmethyl-3,4-epoxycyclohexane carboxylate, 3,4-epoxy-6-methylcyclohexylmethyl-3,4-epoxy-6-methylcyclohexene carboxylate, bis(3,4-epoxy-6-methylcyclohexylmethyl) adipate, bis(2,3-epoxycyclopentyl) ether, aliphatic epoxy modified with polypropylene glycol, dipentene dioxide, epoxidized polybutadiene, silicone resin containing epoxy functionality, flame retardant epoxy resins (e.g., D.E.R.™ 580, a brominated bisphenol type epoxy resin available from Dow Chemical Co.), 1,4-butanediol diglycidyl ether of phenolformaldehyde novolac, and resorcinol diglycidyl ether, and combinations and mixtures of any of the above.

The epoxy compound may be used alone or in combination. Preferred epoxy compounds useful herein include bisphenol-based diepoxy compounds including bisphenol-A epoxy, bisphenol-F epoxy, or a combination comprising at least one of the foregoing. Particularly suitable epoxy compounds include diglycidyl bisphenol A compounds. Preferred are those available from Hexion Specialty Chemicals under the trade name EPON® 828, EPON® 1004 and EPON® 1010, which are difunctional bisphenol A/epichlorohydrin compounds. Other suitable epoxy compounds include ARALDITE® 610, available from Ciba-Geigy; and D.E.R.™ 331, D.E.R.™ 332, and D.E.R.™ 334, available from Dow Chemical Co.

Epoxy novolacs useful herein include the reaction product of a phenolic compound such as phenol, o-, m-, or p-cresol, or a combination of these with an aldehyde, such as formaldehyde, benzaldehyde, acetaldehyde, etc, and substituted with an oxirane group. Typically, the novolac is a phenol-formaldehyde copolymers, wherein phenolic hydroxy groups of the epoxy novolac are substituted with at least one glycidyl ether group.

The epoxy novolacs may have an average epoxy functionality of from about 2 to about 3, and specifically of about 2.5. Such resins also have an epoxide equivalent weight (also referred to as "weight per epoxide" and abbreviated "WPE") as measured by ASTM D 1652 of from about 150 to about 190, more specifically from about 160 to about 185, and still more specifically from about 165 to about 180. Such resins may also have a viscosity, measured at 25° C. by ASTM D 2196, of from about 150 to about 350 poise, more specifically from about 160 to about 325 poise, and still more specifically of from about 170 to about 300 poise. Preferred epoxy novolac resins are sold under the tradename EPON® 161 by Hexion Specialty Chemical, EPALLOY™ 8250 and 8330, available from CVC Thermoset Specialties, and D.E.N.™ 425, available from Dow Chemical Co.

Reactive diluents may have at least one reactive terminal end portion (including an epoxy group, a vinylic group, or a combination of these), and a saturated or unsaturated cyclic backbone. Reactive diluents include those compounds including a $C_{6-30}$ aliphatic compound comprising two or more epoxy groups. Exemplary suitable reactive diluents include monomeric reactive derivatives of $C_{2-30}$ diols, including linear, branched, and cyclic aliphatic diols, and aromatic diols, such as for example 1,4-butanediol diglycidyl ether, 1,4-cyclohexane-dimethanol, resorcinol diglycidyl ether, 1,4-cyclohexanedimethanol diglycidyl ether, 1,4-cyclohexanedimethanol divinyl ether, neopentyl glycol diglycidyl ether, pentaerythritol di-, tri-, or tetraglycidyl ethers, pentaerythritol di-, tri-, or tetraglycidyl(meth)acrylates, trimethylolpropane di- or triglycidyl ethers, trimethylolpropane di- or tri-(meth)acrylates, and the like; or oligomeric or polymeric reactive diluents such as the copolymer of $C_{2-30}$ glycols including ethylene glycol, 1,3-propanediol, 1,4-butanediol, 1,5-pentanediol, 1,6-hexanediol, 1,8-octanediol, 1,10-decanediol, 1,12-dodecanediol, polyethyleneglycol, polypropylene glycol, poly(ethylene glycol-propylene glycol) block or random copolymers, trimethylolpropane, neopentyl glycol, pentaerythritol, or the like, or $C_{2-30}$ carboxylic acids, with oxiranes such as epichlorohydrin. Preferably, the reactive diluents are those having reactive epoxy groups.

Commercially available reactive diluents include "WC-68" from Rhone Poulenc, EPODIL® 741, 749, 750 and 757 from Air Products and Chemicals Incorporated (Allentown, Pa.), RAPICURE®, a divinyl ether of cyclohexanedimethanol available from Allied-Signal Corp. of Morristown, N.J., glycidyl neodeconoate sold under the tradename CARDURA® E-10 by Hexion Specialty Chemicals; dipentaerythritol pentaacrylate sold under the trade designation SR 399, trimethylolpropane triacrylate sold under the trade designation SR 351, ditrimethylolpropane tetraacrylate sold under the trade designation SR 355, and ethoxylated pentaerythritol tetraacrylate sold under the trade designation SR 494, each by Sartomer; and trimethylolpropane (1,3-propanediol-2-ethyl-2-hydroxymethane) polymer with epichlorohydrin, sold under the tradename of HELOXY™ modifier 48 by Hexion Specialty Chemicals.

The first part includes as reactive components about 10 to about 70 wt %, specifically about 15 to about 60 wt %, and more specifically about 20 to about 50 wt %, of the epoxy compound; about 30 to about 90 wt %, specifically about 35 to about 80 wt %, and more specifically about 40 to about 70 wt % of the epoxy novolac; and about 5 to about 25 wt %, specifically about 7 to about 20 wt %, and more specifically about 9 to about 15 wt % of the epoxy-based reactive diluent. Each of these weight percentages is based on the total weight of the reactive resin components of epoxy compound, epoxy novolac, and epoxy based reactive diluent.

The second part of the adhesive composition is the curing agent (also referred to as the "hardener") for the reactive resin components of the first part. The curing agents include in particular an amine composition of a Mannich base and a tertiary amine, where the combination further includes a solvent, specifically a hydroxyaromatic solvent.

The Mannich base is a $C_{6-30}$ organic compound comprising two or more primary amine groups. At least one of the amine groups is a primary amine, and preferably, is a primary aminomethyl group. In an exemplary embodiment, all amine groups in the Mannich base are aminomethyl groups. Suitable such amine-containing $C_{6-30}$ organic compounds include amines, aliphatic amines, aminoethylpiperazine, amido amines, cycloaliphatic amines, and the like. Preferred aliphatic amines include Mannich bases including meta-xylyl diamine (MXDA)-type bases. Suitable Mannich bases include that sold by Air Products Co. under the name ANCAMINE® 1856, and EPIKURE™ 3251 sold by Hexion Specialty Chemicals. Other suitable aliphatic amines include ANCAMINE® 1767 and ANCAMINE® 1768, also available from Hexion Specialty Chemicals. Combinations of these amines may be used.

The tertiary amine is included as a cure accelerator, and is a $C_{6-30}$ compound comprising one or more tertiary amine groups. The tertiary amine may be aromatic or aliphatic, or may include structural features of both.

Useful accelerators include those based on an aromatic structure such as a benzene ring, with dialkylamino groups substituted on the ring. Such accelerators include, for example o-, m-, and p-dimethylaminomethyl benzenes (also referred to as o- m- and p-dimethylaminoxylenes), and tris(dimethylaminomethyl)benzene or tris(dimethylaminomethyl) phenol. Suitable tertiary amine compounds include, for example, ANCAMINE® 110, ANCAMINE® K61B, and ANCAMINE® K54, all sold by Air Products. Co., and EPIKURE™ 3253 sold by Hexion Specialty Chemicals. Preferred tertiary amines includes a 2,4,6-tris-(dimethylaminomethyl) phenol such as that sold under the tradename ANCAMINE® K54 by Air Products Co.

Other amines which may be used in combination with the above amines in the adhesive composition include aliphatic, cycloaliphatic, aromatic and heterocyclic amines, such as bis-(4-aminophenyl)-methane, aniline/formaldehyde resins, benzylamine, octylamine, propane-1,3-diamine, 2,2-dimethyl-1,3-propanediamine(neopentanediamine), hexamethylenediamine, diethylenetriamine, bis(3-aminopropyl) amine, N,N-bis(3-aminopropyl)-methylamine, triethylenetetraamine, tetraethylenepentaamine, pentaethylenehexaamine, 2,2,4-trimethylhexane-1,6-diamine, 1,2- and 1,4-diaminocyclohexane, bis-(4-aminocyclohexyl) methane, bis-(4-amino-3-methylcyclohexyl) methane, 2,2-bis-(4-aminocyclhexyl)propane and 3-aminomethyl-3,5,5-trimethylcyclohexylamine(isophoronediamine), polyaminoimidazo lines, and polyaminoamides such as for example those obtained from aliphatic polyamines and dimerized or trimerized fatty acids. Suitable amines also include the polyoxyalkyleneamines, known as JEFFAMINES®, for example EDR 148, D 230, D 400, or T 403, and sold by Hunstman Chemical, and bis(aminocyclohexyl) methane.

Solvents include those suitable for use in such systems. Useful non-limiting examples of solvents include hydroxy containing compounds such as phenols, cresols, aromatic alcohols such as benzyl alcohol; aliphatic alcohols such as methanol, ethanol, butanol, neopentyl alcohol, t-butyl alcohol, glycols such as ethylene glycol, propylene glycol, ethers such as anisole, dimethoxybenzene, alkyl ethers of glycols, polar aprotic solvents such as N-methylpyrrolidine, and the like, or combinations of these.

The second part includes less than about 20 wt %, specifically about 1 to about 15 wt %, and still more specifically about 1 to about 10 wt % of the hydroxyaromatic solvent; about 80 to about 99 wt %, specifically about 80 to about 90 wt %, and still more specifically about 80 to about 85 wt % of the Mannich base; and about 1 to about 20 wt %, specifically about 3 wt % to about 18 wt %, and still more specifically about 5 to about 15 wt % of a tertiary amine, based on the total weight of hydroxyaromatic solvent, Mannich base, and tertiary amine.

In an embodiment, the Mannich base and the tertiary amine are present in a weight ratio of about 99:1 to about 4:1, specifically about 30:1 to about 4.7:1, and more specifically about 17:1 to about 5.33:1. In a preferred embodiment, the Mannich base and the tertiary amine are present in a weight ratio of about 10:1 to about 7:1, specifically about 9:1 to about 8:1.

The first part, second part, or both the first and second parts may further of the core reactive composition, and may include fillers, pigments, dyes, suspension agents, or a combination comprising at least one of the foregoing additives.

Fillers useful herein may include any suitable fillers, including mineral fillers or organic fillers. Exemplary non-limiting fillers include, talc, mica, titanium dioxide, lithopone, zinc oxide, zirconium, silica, silica aerogel, iron dioxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cork, cotton, synthetic fibers, and the like, and combinations thereof. Preferred fillers include silicas such as silica sand, either fine (>50 mesh), medium (25-50 mesh) or coarse (<25 mesh) grained, alone or in combination.

Pigments, including dyes, may be included to adjust the color of one or both parts (first or second part) of the adhesive composition. Exemplary non-limiting pigments and dyes include titanium dioxide, carbon black, iron oxide, and the like, and combinations comprising at least one of the foregoing.

Suspension agents may be included to ensure homogeneous distribution of components. A particularly useful suspension agent includes fumed silica which also acts as a thixotropic agent and/or a compatibilizer. Exemplary fumed silicas include AEROSIL® 8202 from Evonik, and that sold under the tradename CAB-O-SIL® TS-720 by Cabot.

The amount of filler included depends upon the particular type of adhesive being used, the dispensing method, and anticipated use of the adhesive composition, among other factors. Preferably however, the weight ratio of the active components (that is, the epoxy(s) of the first part plus the curing agent amine(s) of the second part) to the filler is about 0.8:1 to about 2.2:1, and more specifically about 0.8:1 to about 1.5:1. Further, at least about 60 wt %, more specifically at least about 65 wt %, and still more specifically at least about 70 wt % of the filler particles should have a U.S. Sieve size between 16 and 45, inclusive.

In an embodiment, the adhesive composition includes a first part including about 10 to about 50 wt %, specifically about 12 to about 40 wt %, and more specifically about 15 to about 30 wt % of an epoxy compound; about 20 to about 70 wt %, specifically about 25 to about 60 wt %, and more specifically about 30 to about 50 wt % of an epoxy novolac; about 5 to about 20 wt %, specifically about 6 to about 15 wt %, and more specifically about 7 to about 12 wt % of an epoxy-based reactive diluent; and about 10 to about 40 wt %, specifically about 12 to about 35 wt %, and more specifically about 15 to about 30 wt % of first part additives; based on the total weight of the first part.

Filler, as an additive, may be included in the first part in an amount of about 5 to about 40 wt %, specifically about 10 to about 35 wt %, and more specifically about 15 to about 30 wt % of the total weight of the first part.

Pigment, as an additive, may be included in the first part in an amount of less than about 1 wt %, specifically less than about 0.5 wt %, and more specifically less than about 0.2 wt % of the total weight of the first part.

The suspension agent, as an additive, may be included in the first part in an amount of less than about 5 wt %, specifically about 0.1 to about 5 wt %, and more specifically about 0.5 to about 4 wt %, of the total weight of the first part.

Also in an embodiment, the adhesive composition includes a second part including less than about 10 wt % of a hydroxyaromatic solvent, about 10 to about 30 wt % of a Mannich base, and about 0.1 to about 10 wt % of a tertiary amine, and about 60 to about 90 wt % of second part additives, based on the total weight of the second part. The additives included in the first part may be identical to or may differ from the additives included in the second part. In a specific embodiment, the first and second part additives each include filler, pigment, and suspension agent.

Filler, as an additive, may be included in the second part in an amount of about 50 to about 90 wt %, specifically about 55 to about 85 wt %, and more specifically about 60 to about 80 wt % of the total weight of the second part.

Pigment, as an additive, may be included in the second part in an amount of less than about 1 wt %, specifically less than about 0.5 wt %, and more specifically less than about 0.1 wt % of the total weight of the second part.

The suspension agent, as an additive, may be included in the second part in an amount of less than about 5 wt %, specifically about 0.1 to about 5 wt %, and more specifically about 0.5 to about 2 wt %, of the total weight of the second part.

In another embodiment, the pigments in the first and second part are not identical. In another embodiment, the pigment in the first part is a white pigment such as titanium dioxide, and the pigment in the second part is a black pigment such as carbon black. Including different pigments allows for quick visual identification of the components so that, for example, an operator using otherwise identical cartridges or other prepackaged units of the resin composition (first part) and the hardener (second part) would not inadvertently use two of the same component.

The first and second parts are present in a ratio of about 0.8:1 to about 1.2:1, specifically about 0.9:1 to about 1.1:1, and more specifically about 0.95:1 to 1.05:1 by volume. Preferably, the first and second parts are combined in about a 1:1 ratio by volume. In this way, it is possible to provide the composition using a standard two-cartridge or tube dispensing system, each cartridge or tube having the same dimensions and containing the same volume, without need for adapting either a dispense tool (such as a epoxy gun) or the cartridge or tube itself to dispense a different proportion of components other than in a 1:1 volume ratio.

To manufacture the adhesive composition, the components of the first part can be mixed in a first mixer, and the components of the second part can be mixed in a second mixer. The separate mixers can be high speed mixers, sigma blade mixers, planetary mixers, extrusion mixers, and the like. Vigorous mixing, requiring shear without added heat, may be employed to ensure a homogenous distribution of components in each of the first part and the second part.

In an embodiment, a method of forming an adhesive layer includes combining a first part and a second part of an adhesive composition, the first part including the epoxy compound, epoxy novolac, and epoxy-based reactive diluent; and the second part including the hydroxyaromatic solvent, Mannich base, and tertiary amine. The first and second parts are present in a volume ratio of about 0.8:1 to about 1.2:1. In another embodiment, the first and second parts of the adhesive composition additionally include additive. In a specific embodiment, the additive includes filler, pigment, and suspension agent. The method further includes applying the adhesive composition to a surface.

The adhesive composition provided herein may be used for any application which requires the joining of two surfaces, whether the same or different. The joined surfaces may be of any configuration without limitation, such as coplanar surfaces, surfaces having pits, grooves, holes, etc., hole-and-peg arrangements, etc. The surfaces being joined may be of any composition as envisioned herein. For example, the materials which may be joined include metals including steel, aluminum, etc; ceramics, glasses, concrete, or the like, or any combination thereof.

Preferably, the adhesive composition is particularly suitable for use in installing adhesive anchors in concrete elements. In such an application, a borehole is drilled in a concrete element such as a wall, ceiling, floor, beam, etc., and the adhesive composition is injected or placed in the borehole, followed by the anchor. The anchors may be bolts, pins, sleeves, rods, or other such configurations, and may be smooth or textured to allow for increased surface area. The anchors may further be coated with a metal, and/or ceramic coating to facilitate insertion or adhesion, or to improve corrosion resistance. Advantageously, the adhesive composition herein has a sufficiently low viscosity that it is injectable using standard adhesive-injection systems such as manual or power injectors (epoxy guns) such as those manufactured by, for example, Cox Ltd. and M. Kroger, Inc; while remaining sufficiently viscous so that the adhesive does not simply run out of the borehole as where the borehole is drilled in a horizontal surface from below (e.g., a ceiling or overhead beam, etc.), or at an angle tilting toward the ground (e.g., as in a wall or vertical support, etc.).

The adhesive composition, after cure, exhibits improved properties including full reaction, improved performance at elevated temperature, and improved creep resistance.

In an embodiment, the adhesive composition achieves full cure, which is defined as where less than 1 wt %, specifically less than 0.1 wt %, and more specifically less than 0.01 wt %, of the cured composition remains uncured after combining the first and second parts.

The adhesive composition disclosed herein is thus suitable to pass all requirements of ICC-ES AC-308 ("ACCEPTANCE CRITERIA FOR POST-INSTALLED ADHESIVE ANCHORS IN CONCRETE ELEMENTS", International Code Council; effective Nov. 1, 2009), the content of which is incorporated herein in its entirety, which sets out the performance requirements under defined service conditions per 1,000 cycles for a commercial anchor adhesive.

While one or more embodiments have been shown and described, modifications and substitutions may be made thereto without departing from the spirit and scope of the invention. Accordingly, it is to be understood that the present invention has been described by way of illustrations and not limitation. The above embodiments are further illustrated in the following examples.

EXAMPLE

Preparation of an Adhesive Composition

A mixing vessel is charged with 23.50 wt % of bisphenol A diepoxy (D.E.R.™ 331, available from Dow Chemical Co.), 43.01 wt % of epoxy novolac (D.E.N.™ 425, available from Dow Chemical Co.), 9.81 wt % of 2-ethyl-2-hydroxymethyl-1,3-propanediol copolymer with chloromethyloxirane (HELOXY™ modifier 48 by Hexion Specialty Chemicals.), 2.51 wt % of fumed silica suspension agent (AEROSIL® 8202 from Evonik), 0.10 wt % of titanium dioxide, 5.27 wt % of fine silica sand (>50 mesh), and 15.80 wt % of coarse silica sand (<25 mesh). This first composition was mixed until homogeneous.

A second mixing vessel is charged with 24.40 wt % of 1,3-(N,N-dimethylaminomethyl)benzene (MXDA, ANCAMINE® 1856, available from Air Products Co.), 2.80 wt % of tertiary amine hardener (ANCAMINE® K54 by Air Products Co.), 2.80 wt % of benzyl alcohol, 0.90 wt % of fumed silica suspension agent (AEROSIL® 8202 from Evonik), 0.02 wt % of carbon black, 17.50 wt % of fine silica sand (>50 mesh), and 52.48 wt % of coarse silica sand (<25 mesh). This second composition is mixed until homogeneous. Samples (1-5 g) of the first and second compositions are then combined in a 1:1 ratio by volume, and allowed to reach full cure. The resulting cured epoxy adhesive meets or exceeds all requirements of ICC-ES AC-308.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant (s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. An adhesive composition comprising:
   a first part comprising
      about 15 to 30 wt % of a first epoxy compound,
      about 30 to about 50 wt % of an epoxy novolac different from the first epoxy compound, and
      about 7 to about 12 wt % of an epoxy-based reactive diluent different from the first epoxy compound and the epoxy novolac
   based on the total weight of the first part; and
   a second part comprising
      about 1 to about 20 wt % of a hydroxyaromatic solvent,
      about 80 to about 85 wt % of a Mannich base, and
      about 5 to about 15 wt % of a tertiary amine,
   based on the total weight of the hydroxyaromatic solvent, the Mannich base, and the tertiary amine,
   the first and second parts being present in a volume ratio of about 0.8:1 to about 1.2:1;
   wherein upon curing, the adhesive composition meets or exceeds all requirements of ICC-ES AC-308.

2. The adhesive composition of claim 1, wherein the first epoxy compound is a bisphenol-based diepoxy compound including bisphenol-A epoxy, bisphenol-F epoxy, or a combination comprising at least one of the foregoing.

3. The adhesive composition of claim 1, wherein the epoxy novolac comprises the reaction product of a phenolic compound with an aldehyde, wherein phenolic hydroxy groups of the epoxy novolac are substituted with at least one glycidyl ether group.

4. The adhesive composition of claim 1, wherein the epoxy containing reactive diluent is a $C_{6-30}$ aliphatic compound comprising two or more epoxy groups.

5. The adhesive composition of claim 1, wherein the Mannich base is a $C_{6-30}$ organic compound comprising two or more primary amine groups.

6. The adhesive composition of claim 1, wherein the tertiary amine is a $C_{6-30}$ compound comprising one or more tertiary amine groups.

7. The adhesive composition of claim 1, wherein the first part, second part, or both the first and second parts further comprise an additive including filler, pigments, dyes, suspension agents, or a combination comprising at least one of the foregoing additives.

8. An adhesive layer comprising the cure product of the adhesive compound of claim 1.

9. The adhesive layer of claim 8, wherein the cure product forms after combining the first and second parts.

10. A method of forming an adhesive layer comprising:
    combining the first part and the second part of the adhesive composition of claim 1,
    applying the adhesive composition to a surface.

11. An adhesive composition comprising:
    a first part comprising
       about 15 to about 30 wt % of a first epoxy compound, wherein the first epoxy compound is a bisphenol-based diepoxy compound including bisphenol-A epoxy, bisphenol-F epoxy, or a combination comprising at least one of the foregoing,
       about 30 to about 50 wt % of an epoxy novolac different from the first epoxy compound, wherein the epoxy novolac comprises the reaction product of a phenolic compound with an aldehyde, wherein phenolic hydroxy groups of the epoxy novolac are substituted with at least one glycidyl ether group, and
       about 7 to about 12 wt % of an epoxy-based reactive diluent different from the first epoxy compound and the epoxy novolac, wherein the epoxy containing reactive diluent is a $C_{6-30}$ aliphatic compound comprising two or more epoxy groups,
    based on the total weight of first part; and
    a second part comprising
       less than about 20 wt % of a hydroxyaromatic solvent,
       about 80 to about 99 wt % of a Mannich base, and
       about 1 to about 20 wt % of a tertiary amine,
    based on the total weight of hydroxyaromatic solvent, Mannich base, and tertiary amine, the Mannich base and the tertiary amine being present in a weight ratio of about 9:1 to about 8:1;
    the first and second parts being present in a volume ratio of about 0.8:1 to about 1.2:1,
    wherein upon curing, the adhesive composition meets or exceeds requirements of ICC-ES AC-308.

* * * * *